United States Patent [19]

Flint

[11] 3,935,460
[45] Jan. 27, 1976

[54] PROCESSING APPARATUS FOR CLEAR AIR TURBULENCE DETECTION

[76] Inventor: Edward F. Flint, 920 Glencliff Drive, La Habra, Calif. 90631

[22] Filed: Feb. 10, 1975

[21] Appl. No.: 548,874

[52] U.S. Cl. .............................. 250/349; 73/355 R
[51] Int. Cl.² ........................................ G01J 1/00
[58] Field of Search ........... 250/338, 339, 340, 349, 250/350, 353; 73/355 R, 355 EM; 340/227 D

[56] References Cited
UNITED STATES PATENTS
3,696,670  10/1972  Collis ............................ 250/338 X Primary Examiner—Davis L. Willis
Attorney, Agent, or Firm—Philip M. Hinderstein

[57] ABSTRACT

An atomspheric turbulence detection system for use in an aircraft comprising a scanning radiometer for continuously providing a plurality of independent and distinct temperature measurement signals within a given field of view ahead of the aircraft; means for deriving consecutive first signals indicative of the average of all of the temperature measurement signals within the field of view; means for deriving consecutive second signals indicative of the difference between the temperature measurement signals in two vertically displaced regions within the field of view; means for combining the first and second signals to derive consecutive third signals; means for storing consecutively derived third signals for a predetermined period of time and for continuously deriving a fourth signal indicative of the average of the stored third signals; and means for comparing each newly derived third signal with the fourth signal and generating a turbulence warning upon the occurrence of a predetermined difference therebetween.

9 Claims, 3 Drawing Figures

PROCESSING APPARATUS FOR CLEAR AIR TURBULENCE DETECTION

BACKGROUND OF THE INVENTION

1. Field of the invention

The present invention relates to processing apparatus for clear air turbulence detection and, more particularly, to apparatus for processing the temperature measurement signals from a dual beam radiometer so as to provide a turbulence warning with a high detection probability and a low false alarm rate.

2. Description of the Prior Art

Atmospheric turbulence is an environmental condition which effects both passenger safety and comfort and may be physically destructive to aircraft. Most atmospheric turbulence is located at the edge of jet streams and in mountain waves in the atmosphere, although turbulence is also associated with jet streams overrunning convection cold fronts and cold or warm vertical currents between thunderstorms. Since most of such turbulence is not in or adjacent to visible convection activity and is not visible on airplane weather radar, pilots usually have no indication prior to encountering such turbulence.

The National Transportation Safety Board conducted a special study on non-fatal passenger and flight attendant injuries associated with air carrier accidents from 1968 through 1971 caused by turbulence, evasive maneuvers, and self-initiated injuries (personal carelessness). Of the 79 accidents that were investigated in the study, 23 were attibuted to clear air turbulence. The study also revealed that a major operation factor that directly effected both the probability and the severity of injuries was the amount of warning time the pilot was able to provide to flight attendants and passengers. In other words, if the pilot has sufficient warning time to check passenger seat belts, prepare the cabin and galley for turbulence, secure himself in his seat, and, in some cases, take evasive action to avoid the most intensive patches of turbulence, both the probability and the severity of injuries will be substantially reduced.

With the above in mind, there have been several techniques investigated for detecting atmospheric turbulence. However, no system to date has successfully provided the long range capability of detecting atmospheric turbulence with a sufficiently high detection probability and a sufficiently low false alarm rate to justify an operation system.

A Survey of Clear Air Turbulence Detection Methods was presented by Paul W. Kadlec at the USSR/US Aeronautical Technology Symposium co-sponsored by the American Institute of Aeronautics and Astronautics and the USSR State Committee for Science and Technology in Moscow in July, 1973. As reported by Mr. Kadlec, ground based systems include multiwavelength radars with steerable antennas utilized to observe fluctuations in water vapor and temperature that occur in stratified stable layers in the clear atmosphere and the use of optical or lasar radars to observe the structure of the atmosphere or to identify aerosol concentrations in conjunction with areas of turbulence. Programs to develop an airborne system have concentrated primarily on the remote measurement of atmospheric temperature gradients and aerosol motion as possible indicators of clear air turbulence.

The most promising detection technique for an airborne detector utilizes a passive infrared radiometer which senses atmospheric turbulence at distances averaging up to 32 miles ahead of an aircraft. Flight tests with infrared systems have been conducted for many years utilizing both government and commercial aircraft. Such systems measure the infrared energy emitted in certain spectral bands. Since carbon dioxide ($CO_2$) is known to maintain very nearly constant proportions throughout the troposphere and the lower stratosphere, radiometers have been designed to measure its emission/absorption properties. The strong carbon dioxide absorption band centered at 15 microns in the near infrared spectrum has been selected for investigation in all airborne infrared sensors.

Atmospheric data recorded over hundreds of thousands of miles of airline transport routes and studies of dozens of cases of turbulence have indicated that there are infrared signals generated in the proximity of turbulence. These infrared signals are caused by horizontal temperature gradients ahead of the aircraft and vertical temperature lapse rates. Turbulence has been found to be associated with torn cirrostratus clouds when a jet stream overran a cold front at approximately 90° in direction and south of a deep low pressure cell. In such a case, clear air openings, approximately 8 miles wide, in dense cirrostratus clouds appeared approximately 24 to 32 miles from moderate turbulence. These cloud openings are found on the west wide of the turbulence on an eastbound aircraft with a thermal wave on the east side. Where turbulence occurred, there was a radiation change associated with it. On the polar side of a jet stream core, the major turbulence is found above and below the core and both thermal horizontal waves and vertical lapse changes occur. On the other hand, flying through the polar side of a jet stream at the core level, the major thermal signal is a vertical lapse change on the inside of the jet stream and not a horizontal wave.

It therefore becomes obvious that a reliable infrared passive system to warn a pilot in advance of penetration of turbulence must be able to detect horizontal thermal waves, vertical thermal lapse changes, and openings in dense cirrostratus clouds. However, flight tests conducted into and out of clouds at constant temperature have also determined that changes in radiation occur when going into and out of clouds and that this signal must be reduced from the system output to be compatible with the thermal horizontal wave and to provide an anomaly threshold signal with a high rate of detection and low false alarm rate.

The results of flight tests have indicated that the cloud to clear air difference in voltage at 13.8 microns wavelength is twice that at 14.15 microns. Both of these beam outputs were tested at the same calibration against a black body reference. Therefore, two beams from 14.15 and 13.8 microns can be combined with their sensitivities adjusted for equal ice effect. Then, when the beam output voltages are subtracted, the result will be a thermal signal of the atmosphere with reduced ice effect from clouds.

My prior U.S. Pat. No. 3,735,136 issued May 22, 1973, for Dual Color Radiometer Method Selectively Discriminating Against a Radiant Energy Emissivity Characteristic of a Preselected Atmospheric State teaches that by compensatorily gain-changing one of the beam output voltages before combining the two beam output voltages there will be provided a resultant signal with reduced ice effect from clouds. On the other hand, my prior U.S. Pat. No. 3,780,293 issued Dec. 18, 1973, for Dual Beam Radiometer for Clear Air Turbulence Measurement teaches that by adjusting the spectral band pass of one beam and its reference relative to the other beam and its reference, the ice effect may be reduced to a level sufficient to prevent false alarms when flying from clear air to cloud, or vice versa. What remains to be accomplished and is accomplished hereby is the processing of the output of such a dual beam radiometer with reduced ice effect in such a manner as to detect horizontal thermal waves, vertical thermal lapse changes, and openings in dense cirrostratus clouds to provide a turbulence warning signal with a sufficiently high rate of detection and a sufficiently low false alarm rate as to be operational for use in both military and commercial aircraft.

SUMMARY OF THE INVENTION

According to the present invention, there is provided apparatus for processing multi-spectral signals from the atmosphere and generating a turbulence warning for a pilot before an aircraft penetrates turbulence in clear air or in a cirrostratus cloud environment. The present processing apparatus operates upon a detector output of the type which is provided by the dual beam radiometer of my prior U.S. Pat. No. 3,780,293 and is capable of detecting horizontal thermal waves, vertical thermal lapse changes, and openings in dense cirrostratus clouds.

According to the present invention, a dual beam radiometer is modified to scan in a circular pattern in front of the aircraft to continuously provide a plurality of independent and discrete temperature measurement signals within the total field of view encompassed by the circular scan. The average of all of the forward signals in the circular scan is added to the difference between temperature measurement signals in two vertically displaced regions and stored in a memory device for a predetermined period of time, new signals constantly being added to the memory device and the oldest signal constantly being dropped. As the aircraft moves forward, an average of the signals is constantly determined. Each newly derived combined signal is compared to the stored average and a turbulence warning is generated upon the occurrence of a predetermined difference therebetween.

Two thresholds or voltage gates are used for warning signals as a function of the difference between the combined signal and the stored average signal. The first threshold or voltage gate may be used to turn on a caution light for light turbulence and the second threshold or voltage gate may be used to flash the same light for moderate or heavy turbulence. According to the present invention, signals are also provided to actuate a circular display showing the pilot the condition of the atmosphere in a number of positions of the circular scan. With such a display, the pilot can locate the source of the turbulence warning and take evasive action if appropriate.

OBJECTS

It is therefore an object of the present invention to provide processing apparatus for clear air turbulence detection.

It is a further object of the present invention to provide apparatus for processing the temperature measurement signals from a dual beam radiometer so as to provide a turbulence warning with a high detection probability and a low false alarm rate.

It is a still further object of the present invention to provide apparatus for processing signals from the dual beam radiometer for clear air turbulence measurement described in my prior U.S. Pat. No. 3,780,293 for warning a pilot in advance of turbulence penetration.

It is another object of the present invention to provide a simple display to reliably warn a pilot of thermal atmospheric changes associated with turbulence of two levels of intensity.

It is still another object of the present invention to provide a circular display for a pilot to indicate where unusual thermal signals are located ahead of an aircraft to permit the pilot to select a course of least turbulence.

Another object of the present invention is the provision of processing apparatus for clear air turbulence detection in which temperature measurement signals are stored and averaged for comparison to incoming signals.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

According to my U.S. Pat. No. 3,780,293, a dual beam radiometer for clear air turbulence measurement comprises a radiation detector; a source of reference radiation, i.e. a temperature controlled black body; a rotating chopper for alternately passing radiation from the atmosphere and reflecting radiation from the reference source onto the radiation detector; a rotating filter disc having four sections interposed in the radiation path between the rotating chopper and the radiation detector for controlling the wavelength of the radiation applied to the detector, the rotating filter disc being operative, synchronously with the rotating chopper, to periodically change the wavelength of the atmospheric radiation and the wavelength of the reference radiation applied to the detector; and means for controlling the temperature of the reference source as a function of atmospheric temperature adjacent to the radiometer.

In the operation of such a system, activation of the rotating chopper and the rotating filter disc will result in a composite output signal from the radiation detector having four separate and distinct portions. During the first 90° of rotation of the chopper and the filter disc, a signal will be derived indicating the level of radiation from the atmosphere in a column of $CO_2$ having a spectral band pass determined by a first filter section, which may correspond to a short distance beam. During the next 90° of rotation of the chopper and the filter disc, radiation from the reference source is reflected to the detector through a second filter section, generating a reference signal. During the remaining 180° rotation of the chopper and filter disc, signals are derived representing the level of radiation from the atmosphere in a spectral band pass determined by a third filter section and radiation from the reference source with a spectral band pass determined by a fourth filter section. In other words, such a radiometer provides two atmospheric radiation signals from different spectral band passes, each signal being separately compared to its own reference signal. By making the bandwidth of the atmospheric beam nearest 15 microns and its reference signal larger than that of the atmospheric beam furthest from 15 microns and its reference signal, the output signals may be compensated for the ice effect, substantially eliminating such ice effect from the atmospheric turbulence indicating signal. Furthermore, by adjusting the temperature of the reference source as a function of outside air temperature at the vehicle position, the vehicle is permitted to change altitude through various thermal layers of temperature in the vertical direction without creating unwanted thermal slope signals in the atmospheric turbulence indicating signal.

Figure 1:
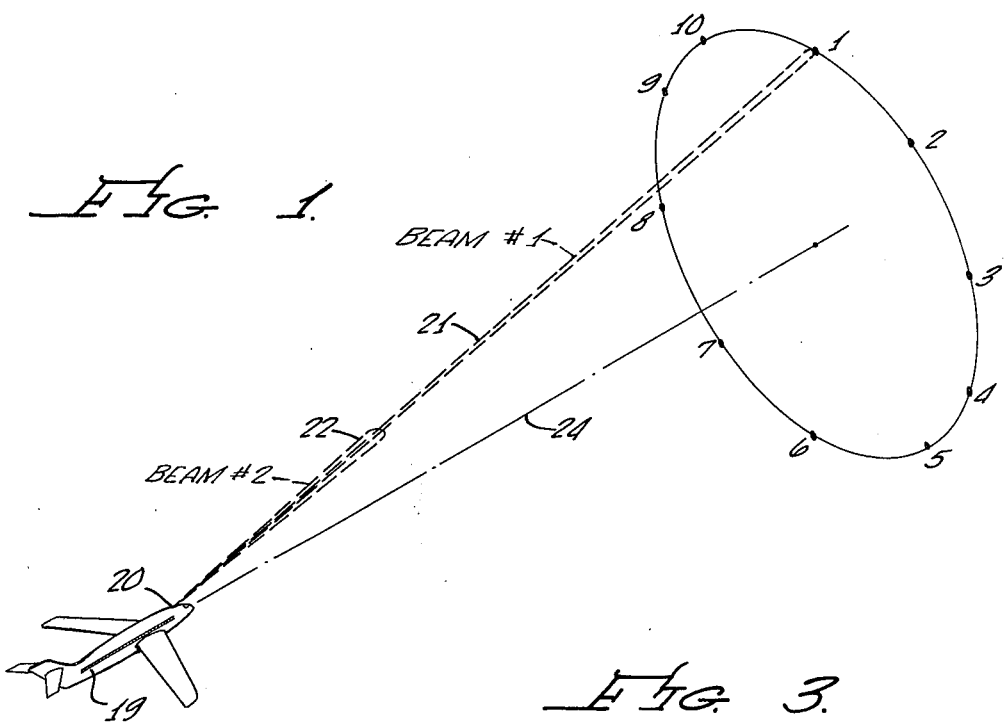
FIG. 1 is a diagramatic view of an aircraft incorporating a dual beam radiometer modified to scan in a circular pattern to provide a plurality of independent and discrete temperature measurement signals at different angular positions.

Referring now to FIG. 1, an aircraft 19 having a radiometer 20 preferably constructed in accordance with the teachings of my prior U.S. Pat. No. 3,780,293 includes two beams 21 and 22 centered at 13.8 microns and 14.15 microns, respectively. Such frequencies are selected as a matter of convenience in that this simplifies the elimination of the ice effect in either of the two ways suggested in my before-mentioned prior U.S. patents. In any event, as taught in my prior U.S. Pat. No. 3,780,293, radiometer 20 will provide a composite output signal $S_R$ indicative of atmospheric temperature for each complete cycle of the rotating chopper and filter disc therein. That is, the composite output signal $S_R$ from radiometer 20 is defined by the equation:

$$S_R = (V_{22} - V_{R2}) - (V_{21} - V_{R1}), \quad (1)$$

where: $V_{22}$ = detector output voltage for beam # 2;
$V_{21}$ = detector output voltage for beam # 1;
$V_{R2}$ = reference voltage for beam # 2; and
$V_{R1}$ = reference voltage for beam # 1.

As should be obvious from equation (1), the $S_R$ signal will vary with atmospheric target temperature changes. On the other hand, by adjusting the temperature of the reference source as a function of outside air temperature at aircraft 19, while $V_{22}$ and $V_{21}$ will change as a function of thermal change with climb or descent of aircraft 19, the $S_R$ signal will hold its value because such changes will be compensated for by changes in $V_{R2}$ and $V_{R1}$.

The normal cruising speed of jet transports is approximately 8 nautical miles per minute and, as beams 21 and 22 penetrate the atmosphere, the $S_R$ signal will be effected by partially filled beams. An anomaly ahead of aircraft 19 will first be seen by beam # 1, the longer beam, and then by beam # 2. Therefore, when flying from clear air into ice, or vice versa, the longer beam will see the ice and react thereto before the shorter beam sees it. However, by using the dual beam approach and the compensation techniques which are the subject of my prior patents, the overall change in $S_R$ will not be sufficient to generate a warning signal of the type to be described more fully hereinafter.

When a thermal discontinuity such as a rising temperature is approached, beam # 1, the longer beam, sees and reacts to it first until beam # 2, the shorter beam, also sees it. $S_R$ will therefore begin to change value in a first direction until such time as beam # 2 sees the anomaly and also starts to react. At this time, $S_R$ reaches a first maximum difference value in the first direction and starts to return towards its original value. However, because of the increased bandwidth of the shorter beam, it has a greater effect on $S_R$ and $S_R$ begins to change value in a second, opposite direction and reaches a second maximum difference value in the second direction. Eventually, the outside air temperature probe senses the temperature change and again effects $S_R$ by adjusting $V_{R2}$ and $V_{R1}$ so that $S_R$ eventually returns to its original value.

It is known that in the absence of local weather conditions, the temperature in the atmosphere normally decreases with altitude in an approximately linear manner, at a rate of typically 2° C per 1000', substantially up to a height known as the tropopause height and thereafter normally remains constant with further increases in altitude. Therefore, it will be colder above aircraft 19 than it is below aircraft 19 and this normal condition can also be used to generate a turbulence warning signal. In other words, if beams 21 and 22 are pitched upwardly, $S_R$ will have a different value than if beams 21 and 22 are pitched downwardly.

To obtain a good understanding of the thermal conditions in front of aircraft 19, beams 21 and 22 are preferably rotated in a circular pattern, designated 23, about the line of sight 24 of aircraft 19. Such rotation is preferably at a rate of one complete rotation per second, a 1 Hz rate. This can be achieved by passing the beams in radiometer 20 through a rotating off-axis objective lens which operates at one-tenth the speed of the rotating chopper and filter disc. A mirror would also be used to stabilize the optical axis in a known manner to correct for pitching of aircraft 19.

Using the example given previously, where the rotating lens is driven at one-tenth the speed of the rotating chopper and filter disc in radiometer 20, radiometer 20 provides ten composite $S_R$ signals for each circular scan. Accordingly, the $S_R$ signals are generated at a 10 Hz rate and, for purposes of discussion, can be considered to correspond to the positions indicated as 1 through 10 in FIG. 1. These ten $S_R$ signals, $S_{R_1}$ through $S_{R_{10}}$ are the equivalent of 20 beams investigating a 4,000 foot diameter circle at a distance of 16 nautical miles in front of aircraft 19, assuming an angle of 2° between beams 21 and 22 and line of sight 24 of aircraft 19. It is obvious that the same result can be provided by ten different detectors without a mechanical scanning technique; however, such a design would not be as cost effective as the use of one high quality detector for the complete solution.

Figure 2:
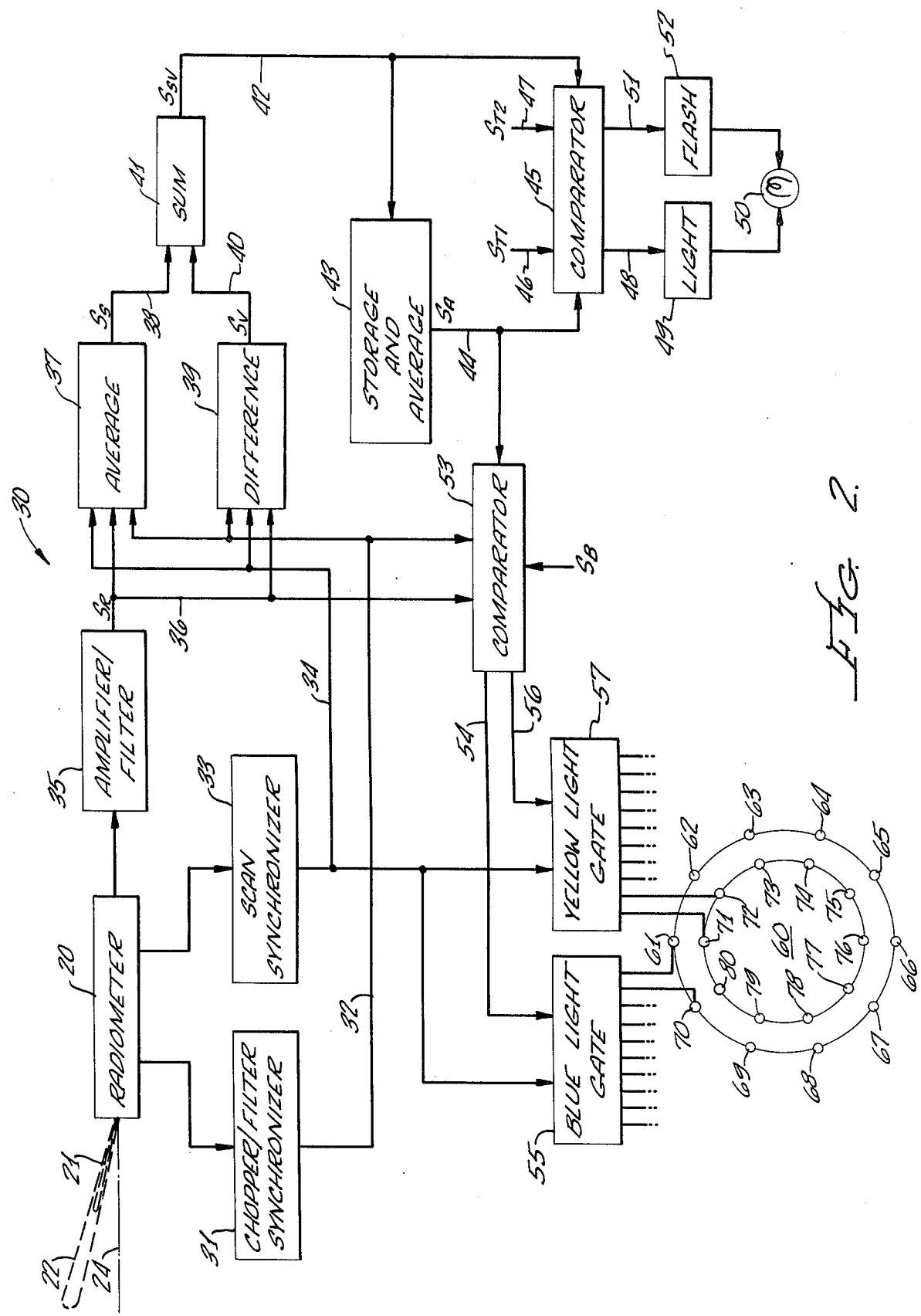
FIG. 2 is a block diagram of processing apparatus constructed in accordance with the teachings of the present invention, including a simple display to indicate where unusual thermal signals are located ahead of an aircraft.

Referring now to FIG. 2, there is shown processing apparatus, generally designated 30, for processing the output of radiometer 20 and for providing a turbulence warning signal. More specifically, processing apparatus 30 includes a chopper/filter synchronizer 31 coupled to radiometer 20 for providing a synchronizing signal on a line 32 for each rotation of the chopper and filter disc in radiometer 20 and a scan synchronizer 33 coupled to radiometer 20 for providing a synchronizing signal on a line 34 for each rotation of the rotating lens in radiometer 20. Apparatus 30 also includes electronic circuitry 35 including an amplifier, filter, and the like, responsive to the output of the radiation detector in radiometer 20 for providing an output on a line 36 at a 10 Hz rate indicative of the composite signal $S_R$. The signals on lines 32, 34 and 36 are applied to the input of an averaging circuit 37 which generates a signal $S_S$ on a line 38 at a 1 Hz rate in accordance with the equation:

$$S_S = \frac{S_{R1} + S_{R2} + S_{R3} + \ldots + S_{R10}}{10}. \qquad (2)$$

In other words, averaging circuit 37 uses the synchronizing signal on line 32 from synchronizer 31 to separate the different $S_R$ signals for each rotation of the chopper and filter within radiometer 20, uses the synchronizing signal on line 34 from synchronizer 33 to select the signals $S_{R_1}$ through $S_{R_{10}}$ corresponding to the positions 1–10 shown in FIG. 1, sums these ten signals, and divides by ten to derive signal $S_S$ which is the average of all signals $S_{R_1}$ through $S_{R_{10}}$.

The $S_S$ signal which represents the average temperature within the total field of view of beams 21 and 22, defined by circle 23, may be used for detection of a horizontal thermal wave ahead of aircraft 19. Thus, and as will be explained more fully hereinafter, The $S_S$ signal can be stored and compared to a subsequent $S_S$ signal to detect a change in the average temperature ahead of aircraft 19.

In order to detect vertical lapse rate changes, the same signals on lines 32, 34 and 36 are applied to a difference detecting circuit 39 which generates a signal $S_V$ on a line 40 at a 1 hz rate in accordance with the equation:

$$S_V = S_{R_1} - S_{R_6}. \qquad (3)$$

That is, the signal $S_V$ is indicative of the difference between the temperature measurement signals in two vertically displaced regions within the total field of view of radiometer 20, i.e. in the present case, the difference between the temperature measurement signals at positions 1 and 6 in FIG. 1. For present purposes, $S_V$ will be assumed to equal $S_{R_1} - S_{R_6}$ since this will simplify the numerical examples given hereinafter. Alternatively, difference detecting circuit 39 might first sum the $S_R$ signals from positions 10, 1 and 2 and then subtract the $S_R$ signals from positions 5, 6 and 7, or the $S_R$ signals from positions 9, 10, 1, 2 and 3 can be added before subtracting the $S_R$ signals from positions 4–8.

The $S_S$ and $S_V$ signals on lines 38 and 40, respectively, are applied to a summation circuit 41 which generates a signal $S_{SV}$ on a line 42 at a 1 Hz rate in accordance with the equation:

$$S_{SV} = S_S + S_V. \qquad (4)$$

The $S_{SV}$ signal is applied to a small computer 43 having the capability of storing consecutively derived $S_{SV}$ signals for a predetermined period of time, such as two minutes. Since beams 21 and 22 are being scanned at a 1 Hz rate, an $S_S$ and an $S_V$ signal are derived once each second so that computer 43 stores, in two minutes, 120 $S_{SV}$ signals. Every second a new $S_{SV}$ signal is added to the storage and the oldest signal dropped out. Immediately upon the addition of a new $S_{SV}$ signal, computer 43 generates a signal $S_A$ on a line 44 indicative of the average of all 120 $S_{SV}$ signals.

The $S_{SV}$ signal on line 42 from summing circuit 41 is continuously applied together with the $S_A$ signal on line 44 from computer 43 to a comparator 45 which compares the two signals and determines the difference $S_W$ therebetween. Comparator 45 also receives over lines 46 and 47 first and second threshold signals $S_{T1}$ and $S_{T2}$, respectively, where $S_{T2} > S_{T1}$. Comparator 45 continuously compares $S_W$ to $S_{T1}$ and $S_{T2}$. If $S_W$ is less than either $S_{T1}$ or $S_{T2}$, no output signal is generated therefrom. On the other hand, where $S_W$, the difference between $S_A$ and $S_{SV}$, either positive or negative, is greater than the first threshold level $S_{T1}$, an output is generated on a line 48 to signal a circuit 49 to light a turbulence warning light 50. Still further, if the difference signal $S_W$ is greater than the second threshold level $S_{T2}$, comparator 45 generates a signal on a second output line 51 to signal a circuit 51 to flash light 50.

Apparatus 30 also includes a circular display 60 consisting of ten blue lights 61–70 and ten yellow lights 71–80 arranged in side-by-side relationship in a circular pattern corresponding to the ten positions 1–10 of beams 21 and 22, as shown in FIG. 1. Blue lights 61–70 are used to signify a temperature signal colder than the average signal, and yellow lights 71–80 are utilized to signify a temperature signal warmer than the average signal. In order to energize lights 61–80, the instantaneous $S_{R_1}$ through $S_{R_{10}}$ signals on line 36 are applied together with the synchronizing signal on line 32 and a biasing signal $S_B$ to a comparator 53 which compares each $S_{R_1}$ through $S_{R_{10}}$ signal with the average of the stored signals $S_A$ on line 44 from computer 43. Biasing signal $S_B$ is utilized to eliminate the effect of the $S_V$ signal from the $S_A$ signal for reasons which will appear hereinafter. If an individual $S_R$ signal is greater than $S_A - S_B$, a signal is applied over a line 54 to a gate circuit 55 which, in conjunction with the synchronizing signal on line 34 from synchronizer 33, energizes one of blue lights 61 through 70. Similarly, if any individual $S_R$ signal is less than $S_A - S_B$, a signal is applied over a line 56 to a gate circuit 57 which, in conjunction with the synchronizing signal on line 34 from synchronizer 33, energizes one of the yellow lights 71 through 80. Bias voltage $S_B$ effectively balances lights 61–80 in display 60 so that the upper half of display 60 will normally have blue lights 61–63, 69 and 70 energized and the lower half of display 60 will normally have yellow lights 74–78 energized under normal, smooth flying conditions. Furthermore, the brightness of lamps 61–80 may be adjusted to be a function of the difference between $S_R$ and $S_A - S_B$.

OPERATION

The operation of processing apparatus 30 may be best understood with the use of a numerical example. Accordingly, assume aircraft 19 is flying at a level altitude with an outside air temperature of $-50°$ C and that amplifier/filter 35 provides an output signal $S_R$ of 100 mV per °C−. That is, with beams 21 and 22 aligned with line of sight 24, $S_R = 5.0$ volts.

As beams 21 and 22 are tilted upwardly, the temperature gets colder and $S_R$ increases. With the normal variation of 2° C per 1,000 foot altitude change, $S_{R_1}$ is a complex function depending upon the exact center frequencies of beams 21 and 22, the pass bands, etc. However, assume for present purposes that $S_{R_1}$ is indicative of a temperature of $-52°$ C, namely 5.2 volts and that $S_{R_8}$ is indicative of a temperature of $-48°$ C, namely 4.8 volts.

Under normal operating conditions, with no thermal anomalies ahead of aircraft 19, $S_S$, the average of $S_{R_1}$ through $S_{R_{10}}$, = 5.0 volts. On the other hand $S_V$, representing the difference between $S_{R_1}$ and $S_{R_8}$, = 0.4 volts. Therefore, $S_{SV}$ = 5.0 + (5.2 − 4.8) = 5.4 volts. Assuming no change in $S_{SV}$ for two minutes, $S_A$ = 5.4 volts. Under such conditions, with the inputs to comparator 45 on lines 42 and 44 equal, the difference signal $S_W$ = 0 and neither circuit 49 nor circuit 52 will be activated.

On the other hand, the individual $S_{R_1}$ through $S_{R_{10}}$ signals, which vary between 4.8 volts and 5.2 volts, will be compared to $S_A − S_B$ in comparator, $S_B$ = 0.4 volts here, so that lights 61–63, 69 and 70 are energized and lights 74–78 are energized to indicate colder temperature above and warmer temperature below the line of sight 24 of aircraft 19.

Assume now that a horizontal temperature gradient is encountered, such an anomaly being associated with 80% or more of all cases of turbulence. The anomaly is first seen by beam 21, simultaneously increasing or decreasing all of the $S_R$ signals. Assuming a uniform thermal wave, each of the $S_R$ signals will increase or decrease proportionately. Assuming a 200 mV increase in each of signals $S_{R_1}$ through $S_{R_{10}}$, $S_{SV}$ = 5.2 + (5.4 − 5.0) = 5.6. In other words, while there will be no change in vertical lapse rate under these conditions, there will be a change in the average thermal signal resulting in a 200 mV change in $S_{SV}$. With $S_{T1}$ set at 200 mV, line 48 will now be energized to light warning light 50, indicating light turbulence.

On the other hand, assuming the thermal anomaly is strong enough so that each of the $S_{R_1}$ through $S_{R_{10}}$ signals increases by 400 mV. Under these circumstances, $S_{SV}$ = 5.4 + (5.6 − 5.2) = 5.8. With this signal compared to $S_A$ and assuming $S_{T2}$ = 400 mV, line 51 will be energized and light 50 will start to flash, indicating moderate turbulence.

Figure 3:
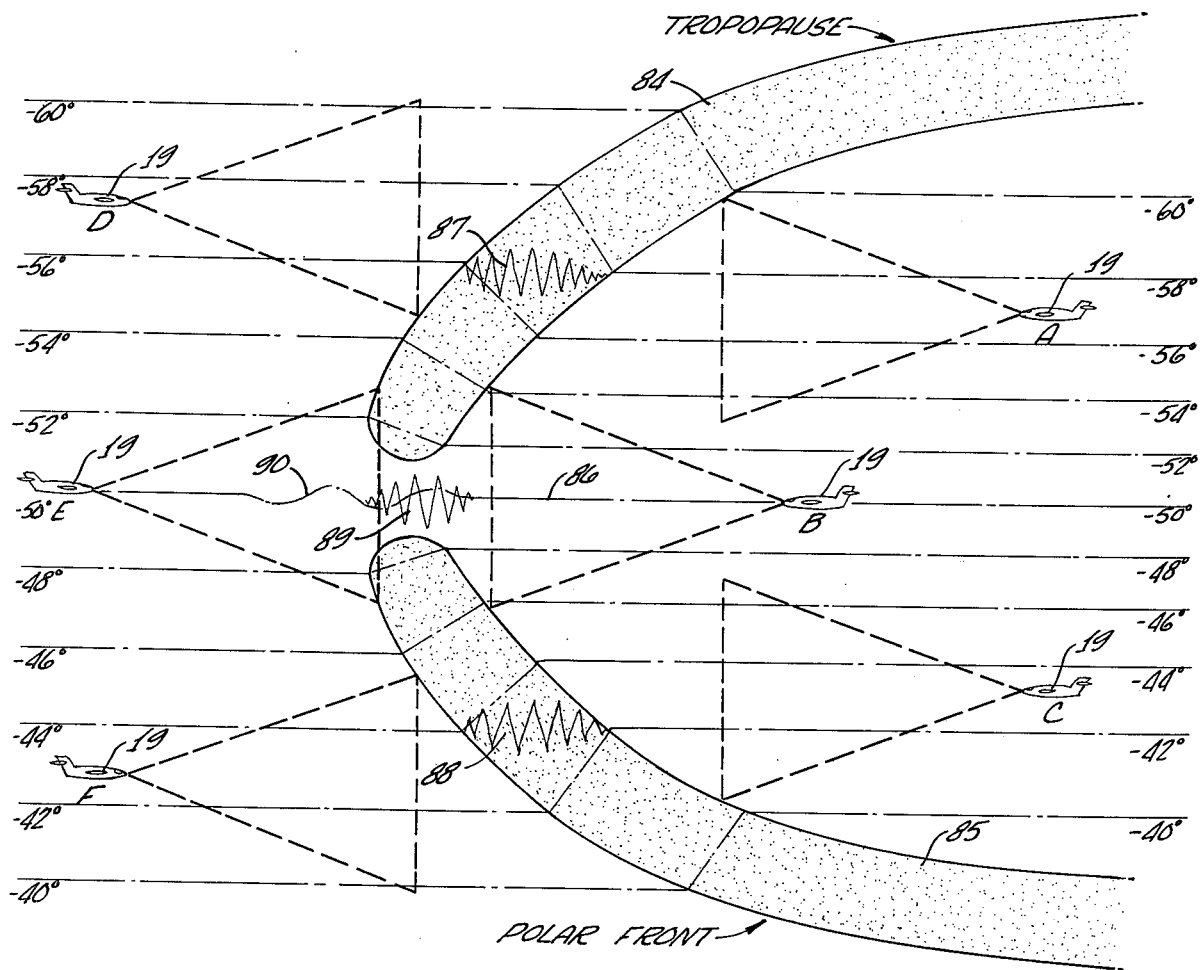
FIG. 3 is a diagramatic representation of a typical jet stream and the temperature variations associated therewith, taken along a vertical plane in the atmosphere.

Referring now to FIG. 3, the reason for combining the horizontal signal and the vertical signal may be best understood by considering the nature of the jet stream and the turbulence associated therewith. In FIG. 3, the jet stream boundary is generally C-shaped, the boundary being defined by the downwardly sloping tropopause 84 and the upwardly sloping polar front 85. The nature of the jet stream boundary is such that when flying therethrough, from right to left in FIG. 3, the temperature increases above the level of core 86 and decreases below the level of core 86. The reverse is obviously true when crossing the jet stream boundary from left to right in FIG. 3, where the temperature decreases above core 86 and increases below core 86. Flight tests have shown that the greatest turbulence is above and below core 86, at 87 and 88, respectively, and the best place to fly through the jet stream boundary is near core 86, within approximately 1,000'. The maximum turbulence is encountered at a height between 2,000' and 5,000' above or below core 86, the total height of the jet stream being approximately 10,000'. Furthermore, turbulence has also been encountered directly at the level of core 86, at 89, adjacent the jet stream boundary.

To fully understand the operation of apparatus 30, consider aircraft 19 flying through the jet stream boundary at three different altitudes, first flying out of the jet stream and then into the jet stream, designated by positions A through F. Positions A, C, D and F correspond to the altitudes of maximum turbulence 87 and 88 whereas positions B and E are aligned with core 86 and turbulence patch 89. Flight tests have shown that because of the curvature of the jet stream boundary, an aircraft 19 at one of positions A, C, D and F, will be practically within the areas of maximum turbulence before a substantial horizontal thermal wave is detected. Also, since the only substantial horizontal wave 90 is on the outside of the jet stream boundary at the level of core 86, an aircraft 19 at position E will detect horizontal wave 90 going into the jet stream but an aircraft 19 at position B will be very close to or in turbulence patch 89 before horizontal wave 90 is detected. On the other hand, aircraft at positions A, C, D and F will detect a vertical lapse rate before reaching the jet stream boundary.

In other words, and considering first an aircraft 19 at position A, the $S_R$ signal will detect a substantial increase in temperature when pointed upwardly while noting no change in temperature when pointing to the side or downwardly. A similar situation will be encountered by an aircraft at position F. An opposite situation will be encountered by aircraft at positions C and D where a substantial decrease in temperature will be sensed when the beams are pointed downwardly but no change will be sensed when pointing to the side or upwardly. Using hypothetical values for the degree of change in $S_R$, a possible $S_{SV}$ signal encountered at each of positions A through F appears as follows:

| | | |
|---|---|---|
| A: | $S_{SV}$ = 5.0 + (5.0 − 4.8) = 5.2 | (5) |
| B: | $S_{SV}$ = 5.0 + (5.1 − 4.9) = 5.2 | (6) |
| C: | $S_{SV}$ = 5.0 + (5.2 − 5.0) = 5.2 | (7) |
| D: | $S_{SV}$ = 5.0 + (5.2 − 5.0) = 5.2 | (8) |
| E: | $S_{SV}$ = 5.4 + (5.1 − 4.9) = 5.6 | (9) |
| F: | $S_{SV}$ = 5.0 + (5.0 − 4.8) = 5.2 | (10) |

As can be seen from an inspection of equations (5), (7), (8) and (10), prior to such time as any horizontal wave is detected, a vertical lapse rate is detected such that $S_{SV}$ changes by 200 mV from its original value, 5.4 volts. In each case, since this difference between $S_{SV}$ and $S_A$ exceeds $S_{T1}$, light 50 is energized. If even a greater lapse rate is detected, light 50 may be caused to flash. Thus, by combining the difference and average signals in summer 41, a turbulence warning is derived as a result of a vertical lapse rate, independently of a thermal horizontal wave.

Considering equation (6), while again no thermal horizontal wave is detected, the increasing upper temperature signal and the decreasing lower temperature signal again generate a turbulence warning indicative of a presence right near core 86 of the jet stream. In the case of equation (9), corresponding to position E, while there will be only a small vertical lapse signal, if any at all, the horizontal thermal wave 90 on the outside of the jet stream boundary will be detected as explained previously.

Processing apparatus 30 therefore processes the output of radiometer 20 in such a manner as to detect horizontal thermal waves, vertical thermal lapse changes, and openings in dense cirrostratus clouds to provide a turbulence warning signal, i.e. light 50, with a sufficiently high rate of detection and a sufficiently low false alarm rate as to be operational for use in both military and commercial aircraft. By combining the horizontal thermal wave signal and the vertical lapse change signal, the total thermal anomaly signal surrounding the turbulence will be increased and the threshold voltages $S_{T1}$ and $S_{T2}$ for activating lamp 50 will be safely above the cloud/ice signal. As stated previously, the number of signals utilized by difference detecting circuit 39 may be selected to adjust the level of $S_V$ compared to $S_S$ and the relative effects of the thermal horizontal wave and the thermal vertical lapse rate.

Simultaneously with the activation of lamp 50, comparator 53 and gates 55 and 57 control display 60 so that the pilot can see where the discontinuity is coming from and take evasive action, if necessary. In other words, with aircraft 19 at position A, there should be no change in the normal illumination of blue lights 63 and 69 and yellow lights 74–78, but the increase in temperature reflected in a decrease in $S_{R_{10}}$, $S_{R_1}$, and $S_{R_6}$ will cause lamps 70, 61 and 62, respectively, to lessen in intensity or to go out entirely and lights 80, 71 and 72 to turn on. Thus, the pilot of aircraft 19 at position A will be warned that the thermal anomaly is approaching from above and that he should lower his altitude. A similar display will be encountered by the pilot of aircraft 19 at position F indicating that he should decrease his altitude or, alternatively, increase his altitude to get closer to core 86 of the jet stream.

With aircraft 19 at position C, there will be no change in normally blue lamps 61–63, 69 and 70 and normally yellow lamps 74 and 78, but yellow lamps 75–77 will lessen in intensity or go out entirely and lights 65–67 turn on in response to the colder temperature detected when beams 21 and 22 are pointed downwardly. A similar display will be encountered by the pilot of aircraft 19 at position D so that evasive action may be taken. On the other hand, the pilot of aircraft 19 at positions B and E will note an equal change in intensity in the upper and lower portions of display 60 indicative of the fact that the thermal discontinuity is directly ahead.

When approaching cold or warm vertical currents between thunderstorms or torn cirrostratus clouds caused by the jet stream overruning a cold front, similar signals will be encountered and display 60 will indicate the direction of the discontinuity. In any event, the pilot will have a sufficient warning time to check the passengers' seat belts, prepare the cabin and galley for the turbulence, secure himself in his seat, and take evasive action to avoid the most intensive patches of turbulence.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In an atmospheric turbulence detection system for use in an aircraft including at least one radiometer for continuously providing a plurality of independent and discrete temperature measurement signals within a given field of view ahead of said aircraft, apparatus for processing said signals to derive an atmospheric turbulence warning comprising:

means for deriving consecutive first signals indicative of the average temperature within said field of view;

means for deriving consecutive second signals indicative of the difference between said temperature measurement signals in two vertically displaced regions within said field of view;

means for combining said first and second signals to derive consecutive third signals;

means for storing consecutively derived third signals for a predetermined period of time and for continuously deriving a fourth signal indicative of the average of said stored third signals; and means for comparing each newly derived third signal with said fourth signal and generating a turbulence warning upon the occurrence of a predetermined difference therebetween.

2. In an atmospheric turbulence detection system according to claim 1, processing apparatus wherein said comparing and generating means generates a first turbulence warning indicative of light turbulence upon the occurrence of a first predetermined difference between each newly derived third signal and said fourth signal and generates a second turbulence warning indicative of moderate turbulence upon the occurrence of a second, greater predetermined difference between each newly derived third signal and said fourth signal.

3. In an atmospheric turbulence detection system according to claim 1, processing apparatus further comprising;

indicator means for visually or audibly indicating a turbulence warning; and means responsive to said comparing means for energizing said indicator means upon the occurrence of a first predetermined difference between each newly derived third signal and said fourth signal.

4. In an atmospheric turbulence detection system according to claim 3, processing apparatus further comprising;

means responsive to said comparing means for alternately energizing and de-energizing said indicator means upon the occurrence of a second, greater predetermined difference between each newly derived third signal and said fourth signal.

5. In an atmospheric turbulence detection system according to claim 1 wherein said at least one radiometer is responsive to radiation lying within two, coaxial, narrow beams of different lengths, said beams being scanned in a circular pattern ahead of said aircraft, said circular pattern defining said field of view, processing apparatus further comprising:

means for deriving consecutive independent and discrete temperature measurement signals at a plurality of positions within said circular pattern, said consecutive temperature measurement signals being applied to said first and second signals deriving means.

6. In an atmospheric turbulence detection system according to claim 5, processing apparatus wherein said first signals deriving means is operative to sum all of said independent temperature measurement signals and divide said sum by the number of said signals to derive an average of said temperature measurement signals.

7. In an atmospheric turbulence detection system according to claim 5, processing apparatus wherein said second signals deriving means is operative to subtract one of said temperature measurement signals derived when said beams are pointing downwardly from one of said temperature measurement signals derived when said beam is pointing upwardly.

8. In an atmospheric turbulence detection system according to claim 5, processing apparatus further comprising;
- a circular display including a plurality of indicator lights corresponding in position to the positions of said beams when said independent and discrete temperature measurement signals are derived, each of said lights being capable of indicating one of two opposite conditions, either cold or warm;
- means for comparing each independent and discrete temperature measurement signal with said fourth signal; and
- means responsive to said comparing means for activating said lights so as to indicate whether each of said independent and discrete temperature measurement signals is warmer or colder than the average of all of said stored temperature measurement signals.

9. In an atmospheric turbulence detection system according to claim 1, processing apparatus wherein said storing means stores consecutively derived third signals for at least two minutes and continuously drops the oldest stored third signal as each newly derived third signal is stored.

* * * * *